United States Patent Office 2,917,530
Patented Dec. 15, 1959

2,917,530

BETA-ALKYLVINYLOXY-BIS(TRIMETHYLSILOXY) ALKYLSILANES

Donald L. Bailey, Snyder, N.Y., assignor to Union Carbide Corporation, a corporation of New York No Drawing. Application December 17, 1957
Serial No. 703,254

3 Claims. (Cl. 260—448.2)

This invention relates to novel organosilicon compounds. More particularly, the invention contemplates the provision of the specific organosilicon compounds, (1) beta - methylvinyloxy - bis(trimethylsiloxy)methylsilane, and (2) beta-ethylvinyloxy-bis(trimethylsiloxy) ethylsilane, as represented by the following respective structural formulae:

(1) 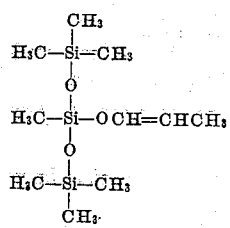

and (2) 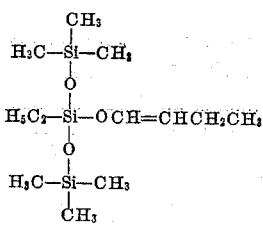

The invention is based on my discovery that the foregoing siloxane structures can be synthesized by the thermal addition of heptamethyltrisiloxane and bis(trimethylsiloxy)ethylsilane to the unsaturated organic aldehydes acrolein and crotonaldehyde, respectively, in the presence of a platinum catalyst. In essence, the synthesis involves the formation of a reaction mixture comprising a silanic hydrogen-bonded siloxane, one of the unsaturated organic aldehydes, and a small amount of a platinum catalyst, followed by heating of the reaction mixture to cause the components to react under influence of the platinum catalyst to effect decomposition of the silanic hydrogen bond of the siloxane and addition of the resulting silicon-hydrogen free radicals to the carbonyl group and 1-carbon atom, respectively, of the unsaturated aldehyde, as represented, for example, by the following skeletal equation illustrating the reaction with acrolein $$(CH_2{=}CHCHO)$$

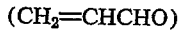
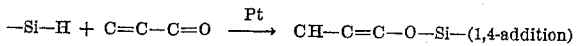

Siloxanes containing at least one silanic hydrogen bond can be added to numerous other unsaturated organic compounds in the presence of a platinum catalyst, to yield the normal adducts which are formed by addition of the siloxanes across the unstable ethylenic or acetylenic carbon to carbon multiple bonds of the unsaturated compounds. Accordingly, it is rather surprising that the addition of such siloxanes to the unsaturated aldehydes occurs through the carbonyl group of the aldehydes with preservation of the very desirable carbon to carbon multiple bond within the resulting adduct. The type of addition illustrated by the foregoing equation is indicated by the fact that the 2,4-dinitrophenylhydrazones prepared from the compounds of the invention contained no silicon but were found to be the derivatives of propionaldehyde and butyraldehyde. It should be noted that siloxane-aldehyde compounds produced by the thermal, platinum-catalyzed addition of Si—H to acetal derivatives of the unsaturated aldehydes, followed by hydrolysis of the resulting acetal adducts, are described and claimed in my copending application Serial No. 703,248, also filed of even date with this application.

The starting material heptamethyltrisiloxane employed in synthesizing the compound beta-methylvinyloxy-bis(trimethylsiloxy) methylsilane may be produced by any one of several conventional procedures. Thus, it can be produced, for example, by the sulfuric acid catalyzed rearrangement of methylhydrogenpolysiloxane

with hexamethyldisiloxane [Me₃SiOSiMe₃] as an end-blocker. This equilibration may be accomplished by simply stirring the reactants at room temperature (25° C.) for a period of from four to eight hours in the presence of from 0.5 to 1 percent by weight of sulfuric acid, followed by suitable known measures for effecting catalyst removal. In a similar manner, the starting material bis(trimethylsiloxy)ethylsilane may be obtained by acid equilibration of hexamethyldisiloxane and ethylhydrogenpolysiloxane.

The platinum catalyst used in promoting addition of the siloxanes to the unsaturated aldehydes, is preferably employed in finely-divided form, either alone, or in combination with an inert support such as charcoal, and the like, or in the form of a multicomponent or heterogeneous catalyst consisting of platinum deposited on the gamma-allotrope of alumina (platinum-on-gamma-alumina).

It is found that the relative concentration of platinum employed for catalyzing these addition reactions is not overly critical, but rather, concentrations of the elemental metal ranging from 0.001 part to about 5 parts by weight of the reactants can be employed and satisfactory results are obtained. In actual practice employing the metal in the form of the heterogeneous catalyst, platinum-on-gamma-alumina, I have found that concentrations of the order of one to two percent by weight of the heterogeneous substance, containing one to two percent by weight of elemental platinum, function admirably for the purpose intended.

In general, the reaction time and temperature of reaction for the production of the addition adducts of the invention are also relatively non-critical, and the reactions can be brought to completion with high yields of the adducts by heating the reactants at temperatures within the range 60–180° C. for periods ranging from about four to twelve hours. In actual practice, I prefer to operate at temperatures within the range 60–150° C. It is relatively essential, however, to effect stirring or agitation of the reaction mixture throughout the time of treatment in order to establish and maintain uniform dispersion of the solid catalyst within the liquid reaction phase.

The compounds of the invention possess numerous desirable properties which render them useful for a relatively wide variety of applications. Thus, by way of illustration, the vinyl groups present therein provide a reactive site for use in the preparation of various addition products. Their vinyl reactivity also makes the compounds useful for combining with other siloxanes and organic compounds to yield silicone elastomers of superior properties, or faster curing thermosetting resins. The compounds, per se, are also useful as silicone oils.

It is believed that the invention may be best understood by reference to the following specific examples describing the foregoing principles and procedures as applied to the production of the novel compounds of the invention.

EXAMPLE I

*Preparation of beta-methylvinyloxy-bis(trimethylsiloxy)-methylsilane [(Me$_3$SiO)$_2$Si(Me)OCH=CHCH$_3$] by addition of heptamethyltrisiloxane to acrolein*

Into a one-liter, three-necked flask equipped with stirrer, thermometer and reflux condenser were charged 222 grams (1 mole) of heptamethyltrisiloxane, 36 grams (0.64 mole) of acrolein, 1 gram of PANA (inhibitor), and 2 grams of one percent platinum-on-gamma-alumina catalyst. The mixture was heated for seven (7) hours with stirring from 60–115° C. At the end of this time, the flask and its contents were cooled to room temperature and the products centrifuged to remove the catalyst. Upon distillation of the products there were obtained 106 grams of low boilers, 52 grams of high boilers, 12.5 grams of residues, and 60 grams of the desired adduct. The compound yielded the following physical and analytical data:

Boiling point—189–191° C. (760 mm.)
Refractive index ($n_D^{25}$)—1.3970

|  | Percent C | Percent Si | Percent H |
|---|---|---|---|
| Found | 42.6 | 30.7 | 9.6 |
| Theoretical | 43.1 | 30.1 | 9.3 |

EXAMPLE II

*Preparation of beta-ethylvinyloxy-bis(trimethylsiloxy)-ethylsilane [(Me$_3$SiO)$_2$Si(Et)OCH=CHCH$_2$CH$_3$] by addition of bis(trimethylsiloxy)ethylsilane to crotonaldehyde*

Into a 500 cubic centimeter flask equipped with reflux condenser, stirrer, and nitrogen inlet tube, were charged 47.5 grams (0.2 mole) of (Me$_3$SiO)$_2$SiEtH, 42 grams (0.6 mole) of CH$_3$CH=CHCHO, and 0.9 gram of one percent platinum-on-gamma-alumina catalyst. The mixture was heated under a nitrogen atmosphere with stirring for nine (9) hours at 100–150° C. It was then cooled to room temperature and centrifuged to remove the catalyst. Upon stripping to 120° C. at 1 mm. there was obtained 84 grams of volatile product. Fractionation of the volatile material gave 47 grams (77 mole-percent yield) of (Me$_3$SiO)$_2$Si(Et)OCH=CHCH$_2$CH$_3$. Identity of the adduct was established by the fact that it hydrolyzed during preparation of the 2,4-dinitrophenylhydrazone derivative, and the derivative formed was that of butyraldehyde. The adduct yielded the following physical and analytical data:

Boiling point—55–57° C./0.5 mm.
Refractive index ($n_D^{25}$)—1.4076

|  | Percent C | Percent Si | Percent H |
|---|---|---|---|
| Found | 46.6 | 26.0 | 10.4 |
| Theoretical | 46.4 | 27.3 | 9.8 |

Having thus described the subject matter of my invention, what it is desired to secure by Letters Patent is:

1. An organofunctional siloxane selected from the group consisting of beta-methylvinyloxy-bis(trimethylsiloxy)-methylsilane and beta-ethylvinyloxy-bis(trimethylsiloxy)-ethylsilane.

2. Beta - methylvinyloxy - bis(trimethylsiloxy) - methylsilane.

3. Beta - ethylvinyloxy - bis(trimethylsiloxy) - ethylsilane.

References Cited in the file of this patent
UNITED STATES PATENTS

| 2,438,520 | Robie et al. | Mar. 30, 1948 |
| 2,823,218 | Speier et al. | Feb. 11, 1958 |